United States Patent
Waaramaa

(10) Patent No.: US 11,130,567 B2
(45) Date of Patent: Sep. 28, 2021

(54) COMPACTLY MOUNTED CYCLIC FLIGHT CONTROL FOR ROTORCRAFT

(71) Applicant: The Boeing Company, Chicago, IL (US)

(72) Inventor: Todd M. Waaramaa, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 16/284,232

(22) Filed: Feb. 25, 2019

(65) Prior Publication Data

US 2020/0269974 A1  Aug. 27, 2020

(51) Int. Cl.
  *B64C 27/56* (2006.01)
  *B64C 13/04* (2006.01)
  *G05G 1/04* (2006.01)

(52) U.S. Cl.
  CPC .......... *B64C 27/56* (2013.01); *B64C 13/0421* (2018.01); *G05G 1/04* (2013.01)

(58) Field of Classification Search
  CPC ........ B64C 27/56; B64C 13/0421; G05G 1/04
  See application file for complete search history.

(56) References Cited

U.S. PATENT DOCUMENTS

| | | | |
|---|---|---|---|
| 4,667,909 A | 5/1987 | Curci | |
| 2006/0254377 A1 | 11/2006 | Henle | |
| 2009/0230252 A1* | 9/2009 | Daunois | B64C 27/56 244/234 |
| 2010/0025539 A1* | 2/2010 | Hanlon | B64C 13/0421 244/223 |
| 2011/0303038 A1* | 12/2011 | Peterson | G05G 9/047 74/471 XY |
| 2012/0255386 A1 | 10/2012 | Couderc et al. | |
| 2016/0004270 A1 | 1/2016 | Taylor et al. | |
| 2018/0346110 A1 | 12/2018 | Mercer et al. | |

FOREIGN PATENT DOCUMENTS

EP    2284641 A1    2/2011

OTHER PUBLICATIONS

European Search Report; Application EP20154144; dated Jul. 23, 2020.

* cited by examiner

*Primary Examiner* — Rodney A Bonnette
(74) *Attorney, Agent, or Firm* — Duft & Bornsen, PC

(57) ABSTRACT

Systems and methods for compactly mounted cyclic flight control for a rotorcraft. One embodiment is an apparatus that includes a stick base assembly coupled with a cyclic stick and configured to rotate with respect to a mounting frame to control a pitch and a roll of the rotorcraft. A cyclic housing is pivotably coupled with the mounting frame for rotation about a pitch axis to control pitch, and coupled with a pitch actuator having a pitch force sensor to measure its resistance to rotation. The cyclic housing supports the stick base assembly for independent rotation of the stick base assembly about a roll axis to control roll, and the stick base assembly couples with a roll actuator having a roll force sensor to measure its resistance to rotation.

20 Claims, 14 Drawing Sheets

COMPACTLY MOUNTED CYCLIC FLIGHT CONTROL FOR ROTORCRAFT

FIELD

This disclosure relates to a flight control system and, in particular, to a flight control system for a rotary wing aircraft.

BACKGROUND

A typical rotary wing aircraft, such as a helicopter, includes three flight control inputs—the cyclic stick to control pitch and roll, the collective lever to control thrust, and pedals to control yaw. The cyclic stick is generally located in front of the pilot and, depending on complexity of the helicopter, may be coupled with components that implement assisted actuation and tactile feedback for the pilot. However, in existing rotorcrafts, the components enabling such features take up valuable space in the cockpit underneath the pilot.

SUMMARY

Embodiments described herein provide for compactly mounted cyclic flight control for a rotorcraft. A cyclic housing is provided to couple with the cyclic stick of the rotorcraft. The cyclic housing advantageously enables mounting multiple advanced flight control components in a compact configuration. In particular, the cyclic housing integrates stick actuators and force sensors into a Line Replaceable Unit (LRU) that can be installed/swapped into the existing mechanical configuration of the rotorcraft. Accordingly, the rotorcraft can be equipped with assisted actuation and tactile feedback piloting features in a manner that maximizes available space in the cockpit and simplifies installation and maintenance.

One embodiment is an apparatus that includes a stick base assembly coupled with a cyclic stick and configured to rotate with respect to a mounting frame to control a pitch and a roll of the rotorcraft. The apparatus also includes a cyclic housing pivotably coupled with the mounting frame for rotation of the cyclic housing and the stick base assembly together about a pitch axis to control the pitch of the rotorcraft, and coupled with a pitch actuator to assist the rotation about the pitch axis, wherein a pitch force sensor coupled between the pitch actuator and the mounting frame measures a resistance applied to the rotation by the pitch actuator. The cyclic housing configured to support the stick base assembly for independent rotation of the stick base assembly about a roll axis to control the roll of the rotorcraft, wherein the stick base assembly couples with a roll actuator to assist the independent rotation about the roll axis, and a roll force sensor coupled between the roll actuator and the cyclic housing measures a resistance applied to the independent rotation by the roll actuator.

Another embodiment is a method of constructing a cyclic control apparatus of a rotorcraft. The method includes fabricating a cyclic housing to be disposed between a mounting frame and a cyclic stick configured to control a pitch and a roll of the rotorcraft, rotatably coupling the cyclic housing to the mounting frame for rotation of the cyclic housing about a pitch axis, and coupling a pitch actuator to the cyclic housing to assist the rotation about the pitch axis and the control of the pitch. The method also includes coupling a pitch force sensor between the pitch actuator and the mounting frame to measure a resistance applied to the rotation by the pitch actuator, rotatably coupling a stick base assembly of the cyclic stick to the cyclic housing for independent rotation of the stick base assembly about a roll axis, coupling a roll actuator to the stick base assembly to assist the independent rotation about the roll axis and the control of the roll, and coupling a roll force sensor between the roll actuator and the cyclic housing to measure a resistance applied to the independent rotation by the roll actuator.

Yet another embodiment is an apparatus that includes a cyclic housing including a structural frame to rotatably couple with a mounting frame, the structural frame including: a bottom portion rotatably mounted to the mounting frame and including a first hollow passage along a pitch axis sized to receive a pitch actuator that rotates about the pitch axis to control a pitch of a rotorcraft, and a top portion disposed above the bottom portion and including a second hollow passage along a roll axis sized to receive a roll actuator that rotates about the roll axis to control a roll of the rotorcraft.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
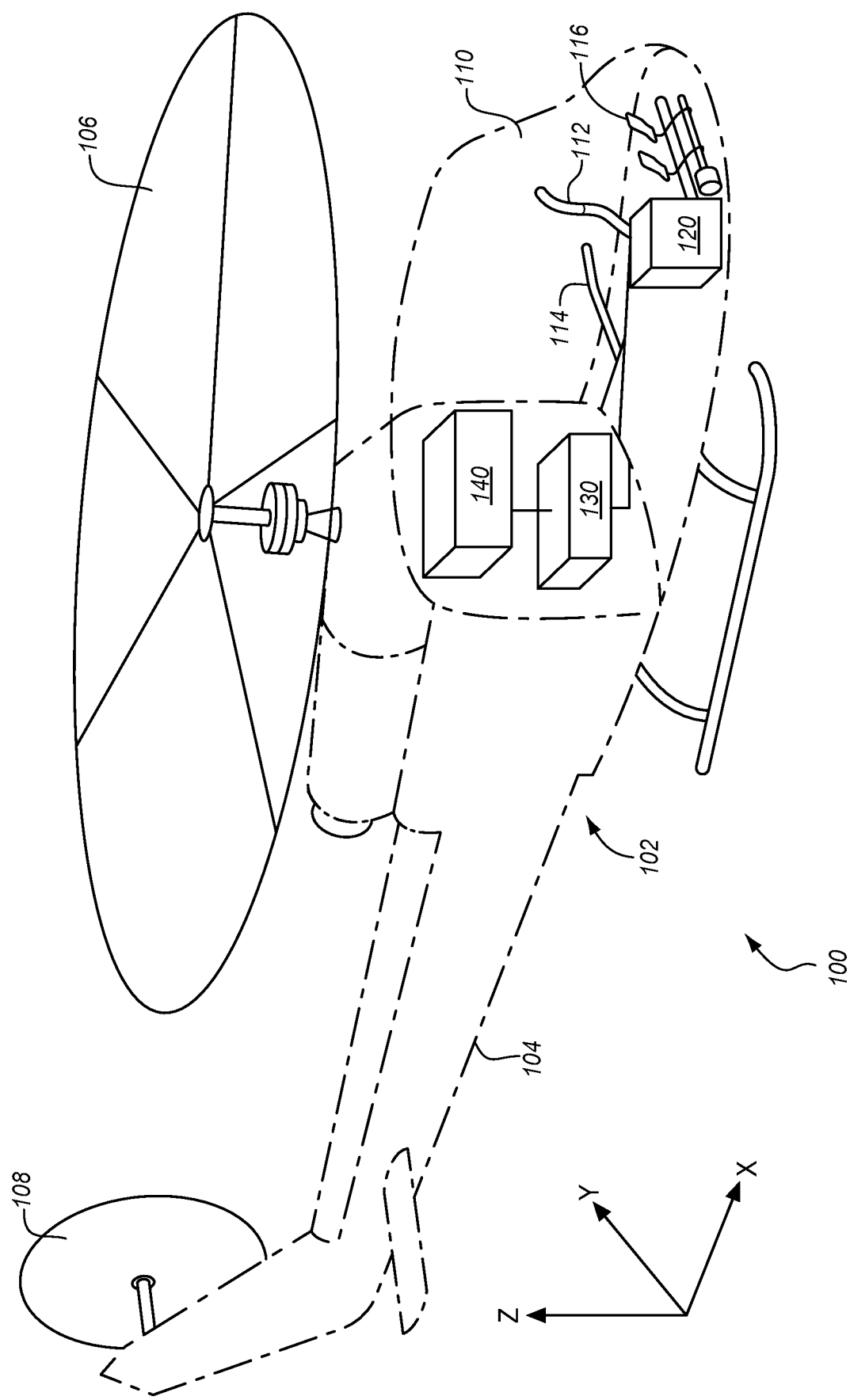
FIG. 1 illustrates a helicopter in an illustrative embodiment.

FIG. 1 illustrates a helicopter 100 in an illustrative embodiment. The helicopter 100 includes a fuselage 102, a tail boom 104, a main rotor 106, and a tail rotor 108. The helicopter 100 also includes a cockpit 110 having inceptors 112-116 for pilot flight control. In particular, a cyclic stick 112 is moveable about two axes to control pitch (e.g., longitudinal movement or rotation about the Y-axis) and roll (e.g., lateral movement or rotation about the X-axis) of the helicopter 100. Also provided is a collective lever 114 to control rotor thrust and thus a height and speed of the helicopter 100, and rudder pedals 116 to control a yaw (e.g., directional movement or rotation about the Z-axis) of the helicopter 100.

The inceptors 112-116 control the movement of the helicopter using a series of mechanical links and actuators. For instance, to control the pitch and roll of the helicopter 100, the cyclic stick 112 movement translates to the main rotor 106 via a stick base assembly 120, a mechanical linkage 130, and a rotor actuator 140. In existing implementations, the stick base assembly 120 couples to the mechanical linkage 130 via a series of bell-cranks and clutches. Unfortunately, this hardware occupies valuable space underneath the pilot in the helicopter 100.

Figure 2:
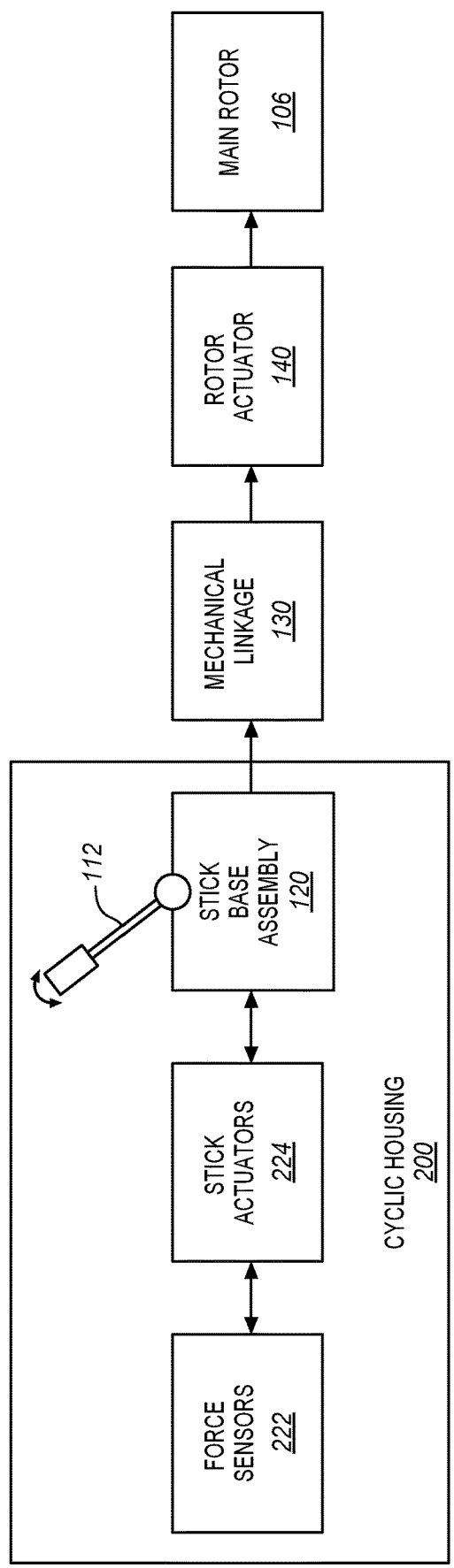
FIG. 2 is a block diagram illustrating a cyclic housing enabling compactly mounted cyclic control equipment in an illustrative embodiment.

FIG. 2 is a block diagram illustrating a cyclic housing 200 enabling compactly mounted cyclic control equipment in an illustrative embodiment. Compared with existing cyclic control configurations, the cyclic housing 200 facilitates mounting equipment related to dynamic control of the cyclic stick 112 in a compact configuration. In particular, the cyclic housing 200 enables mounting the stick base assembly 120, one or more force sensors 222, and/or one or more stick actuators 224 together as an integrated unit. Thus, in addition to providing extra available space in a space-constrained area of the helicopter, the cyclic housing 200 advantageously enables combining the equipment as a Line Replaceable Unit (LRU) while maintaining the existing mechanical connections (e.g., the mechanical linkage 130) of the helicopter 100.

Figure 3:
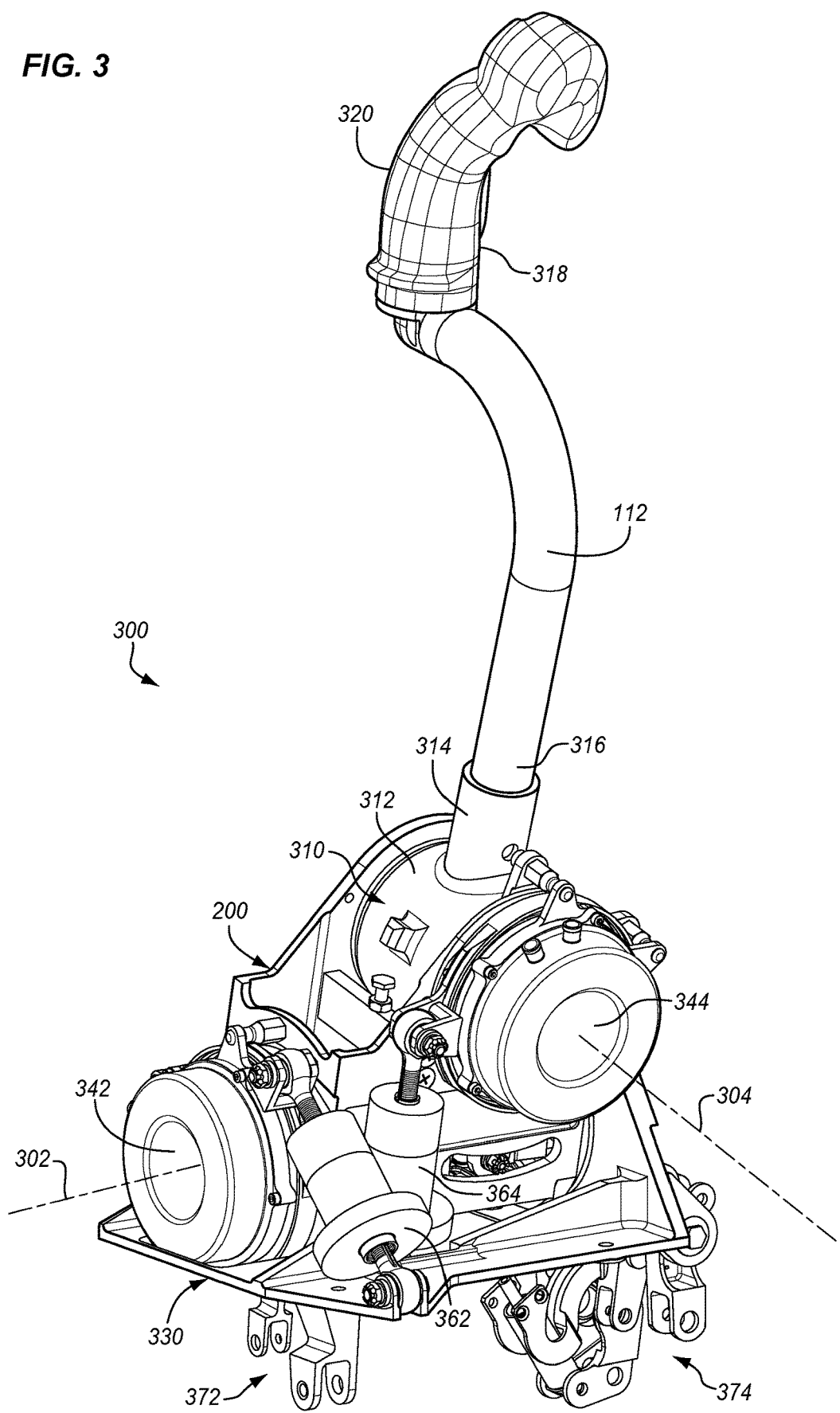
FIG. 3 is a perspective view of an apparatus including a cyclic housing in an illustrative embodiment.

FIG. 3 is a perspective view of an apparatus 300 including the cyclic housing 200 in an illustrative embodiment. The cyclic housing 200 generally comprises a structure disposed between a stick base assembly 310 and a mounting frame 330. The cyclic housing 200 is pivotably coupled with the mounting frame 330 for rotation of the cyclic housing 200 about a pitch axis 302. The cyclic housing 200 is also coupled with the stick base assembly 310 to rotatably support the stick base assembly 310 for rotation of the stick base assembly 310 about a roll axis 304.

The stick base assembly 310 couples with the cyclic stick 112 and pivots therewith for cyclic flight control by the pilot of the rotorcraft. In particular, the stick base assembly 310 may include a tubular body 312 and a stick receiving member 314 protruding therefrom which receives a base end 316 of the cyclic stick 112. A top end 318 of the cyclic stick 112, distal from the base end 316, includes a pilot grip 320 for pilot handling.

Generally, the pilot maneuvers the cyclic stick 112 about two axes to control pitch and roll of the rotorcraft. To control pitch, the pilot actuates the cyclic stick 112 to rotate about the pitch axis 302. Pitch actuation rotates the cyclic stick 112, the stick base assembly 310, and the cyclic housing 200 together about the pitch axis 302. In other words, rotation of the cyclic stick 112, the stick base assembly 310, and the cyclic housing 200 about the pitch axis 302 is linked.

By contrast, to control roll, the pilot actuates the cyclic stick 112 to rotate about the roll axis 304, which is perpendicular to the pitch axis 302. With respect to the roll axis 304, the cyclic housing 200 is rotatably fixed. Roll actuation therefore rotates the cyclic stick 112 and the stick base assembly 310 together about the roll axis 304 without rotating the cyclic housing 200. In other words, the cyclic housing 200 rotatably supports the stick base assembly 310 for independent rotation of the stick base assembly 310 about the roll axis 304.

The configuration of the cyclic housing 200 in the apparatus 300 advantageously enables mounting equipment that provides parallel force assistance in a compact configuration near the pivot point of the cyclic stick 112. In particular, the apparatus 300 provides a technical benefit by compactly mounting one or more stick actuators 342-344 and/or one or more force sensors 362-364 between the mounting frame 330 and the stick base assembly 310 as an integrated unit. Therefore, the apparatus 300 may be configured as a Line Replaceable Unit (LRU) that can be easily installed/swapped at the pivoting location of the cyclic stick 112, as opposed to mounting the stick actuators 342-344 and the force sensors 362-364 remotely from the pivot point of the cyclic stick 112 via a series of bell-cranks and clutches.

The stick actuators 342-344 include any combination of devices or components configured to assist rotation of the cyclic stick 112. Here, the apparatus 300 includes a pitch actuator 342 to assist pitch of the rotorcraft and a roll actuator 344 to assist roll of the rotorcraft. More particularly, the cyclic housing 200 couples with the pitch actuator 342 to assist rotation about the pitch axis 302, and the stick base assembly 310 couples with the roll actuator 344 to assist rotation about the roll axis 304. The stick actuators 342-344 may couple in parallel with the mechanical system of the rotorcraft to implement a variety of advanced flight control functions, including but not limited to, automated balance/actuation of the cyclic stick 112 for automatic control of pitch/roll, tactile feedback for the pilot, and cruise control. Example components of the stick actuators 342-344 include a motor, a gearbox, a clutch, and a resolver.

The force sensors 362-364 include any combination of devices or components configured to measure a resistance to rotation or a rotation force as applied by the stick actuators 342-344. Here, the apparatus 300 includes a pitch force sensor 362 coupled between the pitch actuator 342 and the mounting frame 330 to measure a resistance to rotation about the pitch axis 302 applied by the pitch actuator 342. The apparatus 300 also includes a roll force sensor 364 coupled between the roll actuator 344 and the cyclic housing 200 to measure a resistance to rotation about the roll axis 304 applied by the roll actuator 344. The force sensors 362-364 may implement further advanced flight control functions, such as regulating/controlling the force that the pilot experiences at the cyclic stick 112. Example components of the force sensors 362-364 include a displacement sensor and a spring.

The cyclic housing 200 generally mounts/houses the pitch actuator 342 to align with and rotate about the pitch axis 302. The pitch actuator 342 is thus generally disposed between the cyclic housing 200 and the mounting frame 330. Additionally, the cyclic housing 200 is rotatably coupled with the pitch actuator 342 for linked rotation about the pitch axis 302. The pitch actuator 342 may thus control rotation about the pitch axis 302 for automated pitch maneuverability of the rotorcraft. Furthermore, the pitch force sensor 362 couples to the mounting frame 330 and perimeter of the pitch actuator 342 to measure the automated control of rotation about the pitch axis 302.

In addition, the cyclic housing 200 mounts/houses the roll actuator 344 to align with and rotate about the roll axis 304. The roll actuator 344 is disposed above the pitch actuator 342 and underneath the cyclic stick 112. The cyclic housing 200 is thus configured to mount the stick actuators 342-344 in a vertical configuration below the cyclic stick (112) of the rotorcraft. Additionally, the stick base assembly 310 is rotatably coupled with the roll actuator 344 for rotation about the roll axis 304. The roll actuator 344 may thus control rotation about the roll axis 304 for automated roll maneuverability of the rotorcraft. Also, the roll force sensor 364 couples to the cyclic housing 200 and perimeter of the roll actuator 344 to measure the automated control of rotation about the roll axis 304.

The apparatus 300 enables the stick actuators 342-344 to couple with the existing mechanical system of the rotorcraft. That is, the pitch actuator 342 couples with and actuates pitch connections 372, and the roll actuator 344 couples with and actuates roll connections 374. The pitch connections 372 and roll connections 374 may include or interface with the mechanical linkage 130 described above that mechanically couples cyclic control to the rotor actuator 140 and the main rotor 106 of the rotorcraft. Accordingly, the apparatus 300 advantageously enables installing the stick actuators 342-344 and the force sensors 362-364 as an integrated unit that frees up the confined space underneath the pilot and that can be swapped into and out of the rotorcraft while maintaining the existing mechanical design of the rotorcraft.

Figure 4:
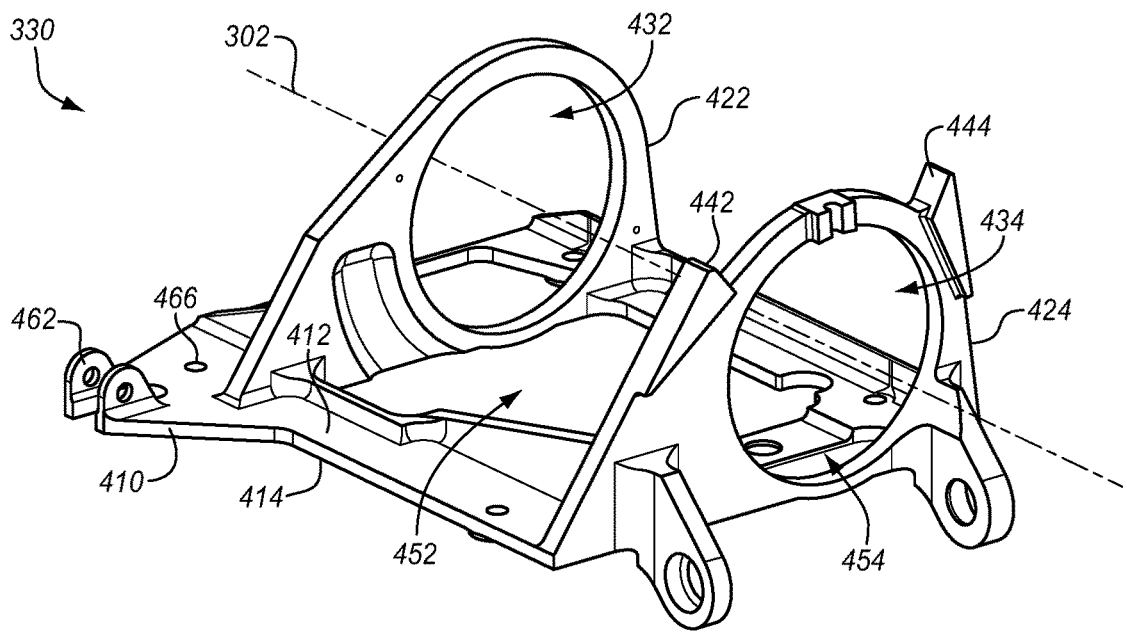
FIG. 4 is a perspective view of a mounting frame in an illustrative embodiment.

FIG. 4 is a perspective view of the mounting frame 330 in an illustrative embodiment. The mounting frame 330 comprises a structure that includes a base plate 410 having a top surface 412 and a bottom surface 414, and further includes one or more housing coupling members 422-424 protruding from the top surface 412. In this example, the mounting frame 330 includes a pair of housing coupling members 422-424 spaced along and aligned with the pitch axis 302. The housing coupling members 422-424 include respective pitch actuator holes 432-434 to align/center with the pitch axis 302 and receive the pitch actuator 342 (not shown in FIG. 4). At least one of the housing coupling members 422-424 (e.g., housing coupling member 424 in FIG. 4) may include pitch guide surfaces 442-444 described in greater detail below.

The base plate 410 of the mounting frame 330 also includes one or more voids 452-454 in the space between the housing coupling members 422-424. In this example, a first void 452 provides a space for mechanically coupling the pitch actuator 342 and the pitch connections 372, and a second void 454 provides a space for mechanically coupling the roll actuator 344 and the roll connections 374 (not shown in FIG. 4). Furthermore, base plate 410 includes an attachment point 462 protruding from the top surface 412 for coupling with the pitch force sensor 362 (see e.g., FIG. 3). The attachment point 462 may include a hinge, joint, clevis, or other type of attachment point to couple or pivotally couple with an end of the pitch force sensor 362. The base plate 410 also includes one or more mounting holes 466 to fix the mounting frame 330 in the rotorcraft. Thus, as described in further detail below, the mounting frame 330 may be fixed relative to other components of the apparatus 300.

Figure 5:
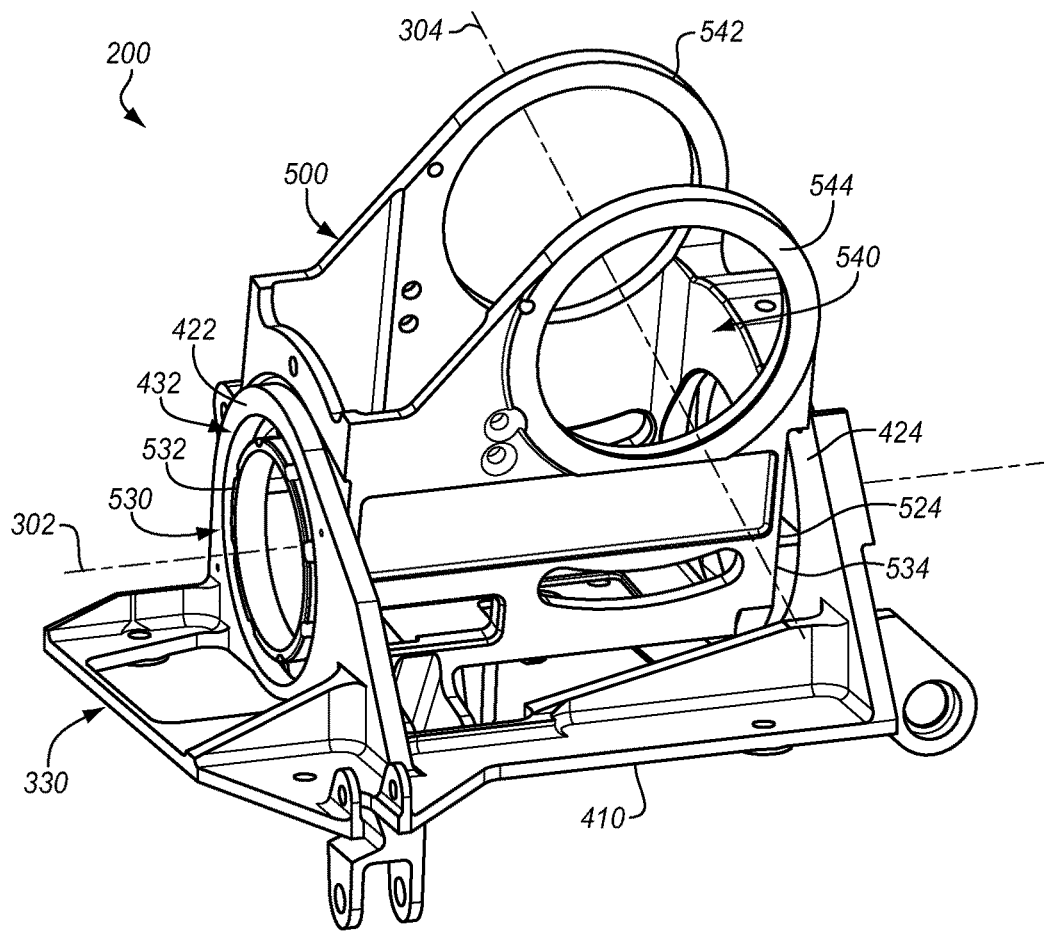
FIG. 5 is a first perspective view of a cyclic housing mounted with a mounting frame in an illustrative embodiment.
Figure 6:
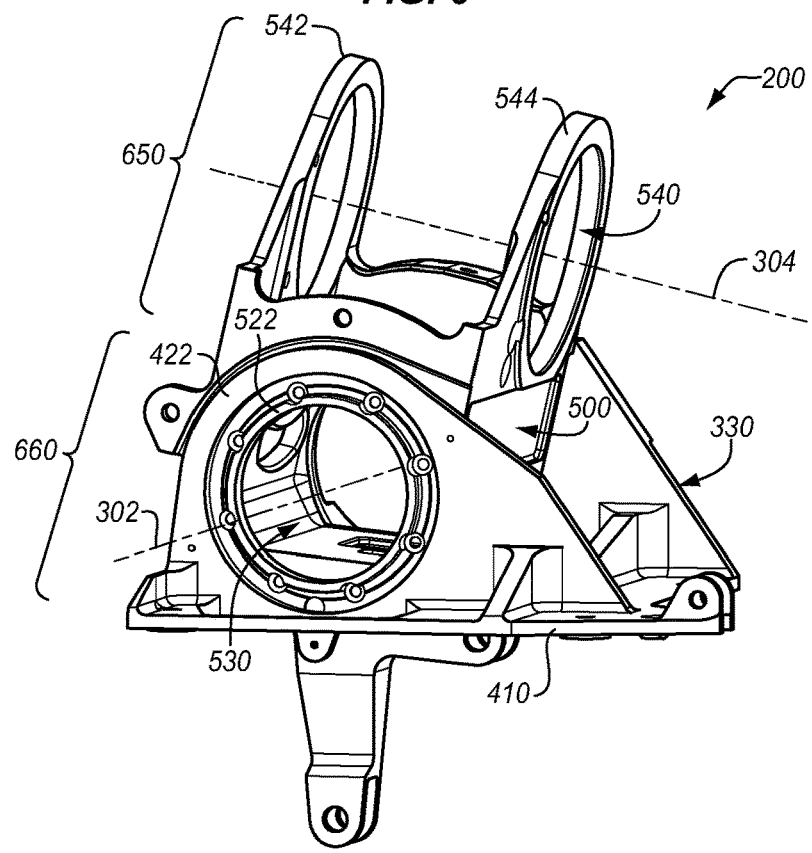
FIG. 6 is a second perspective view of a cyclic housing mounted with a mounting frame in an illustrative embodiment.
Figure 7:
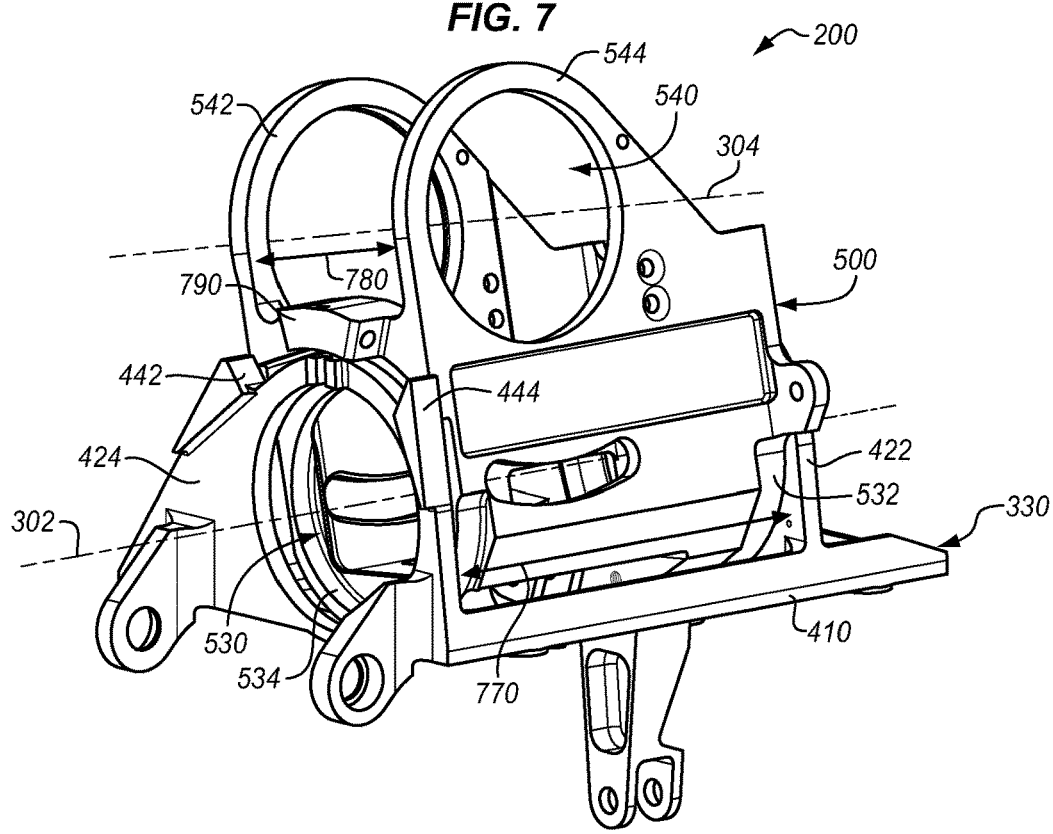
FIG. 7 is a third perspective view of a cyclic housing mounted with a mounting frame in an illustrative embodiment.

FIG. 5 is a first perspective view of the cyclic housing 200 mounted with the mounting frame 330 in an illustrative embodiment. FIG. 6 is a second perspective view of the cyclic housing 200 mounted with the mounting frame 330 in an illustrative embodiment. FIG. 7 is a third perspective view of the cyclic housing 200 mounted with the mounting frame 330 in an illustrative embodiment. FIGS. 5-7 show the structural configuration of the cyclic housing 200 and the mounting frame 330 by omitting illustration of the stick base assembly 310, the stick actuators 342-344, and the force sensors 362-364.

Referring first to FIG. 5, the cyclic housing 200 generally comprises a structural frame 500 situated over the top surface 412 of the base plate 410 and between the housing coupling members 422-424 of the mounting frame 330. The structural frame 500 includes a first hollow passage 530 extending along the pitch axis 302, and a second hollow passage 540 extending along the roll axis 304. The first hollow passage 530 and the second hollow passage 540 are sized to receive the pitch actuator 342 and the roll actuator 344, respectively.

In this example, the first hollow passage 530 is defined by a first pair of support holes 532-534 in either side of the structural frame 500 along the pitch axis 302. The first hollow passage 530 thus extends through the cyclic housing 200 between the first pair of support holes 532-534 which are spaced along and aligned with the pitch axis 302. The support holes 532-534 axially align with one another and with the pitch actuator holes 432-434 of the mounting frame 330. For instance, as shown in FIG. 5, an outer rim of support hole 532 may rotate at a position that is concentric with, radially inward from, and/or inside of the pitch actuator hole 432 of housing coupling member 422. Likewise, as perhaps best viewed in FIG. 7, support hole 534 may be similarly positioned with respect to pitch actuator hole 434 of housing coupling member 422. This alignment enables rotatably mounting the cyclic housing 200 on the mounting frame 330 for rotation about the pitch axis 302, and also enables the pitch actuator 342 to be inserted into the first hollow passage 530 to rotate with the cyclic housing 200 about the pitch axis 302.

The second hollow passage 540 may be similarly defined by a second pair of support holes 542-544 in either side of the structural frame 500 along the roll axis 304. The second hollow passage 540 thus extends through the cyclic housing 200 between the second pair of support holes 542-544 which are spaced along and aligned with the roll axis 304. The second pair of support holes 542-544 axially align with one another and with end rims of the stick base assembly 310, as described in greater detail below. This alignment enables rotatably mounting the stick base assembly 310 on the cyclic housing 200 for rotation about the roll axis 304, and also enables the roll actuator 344 to be inserted into the second hollow passage 540 to rotate independently from the cyclic housing 200 about the roll axis 304.

Referring now to FIG. 6, the structural frame 500 of the cyclic housing 200 generally comprises a top portion 650 that includes the second pair of support holes 542-544, and a bottom portion 660 that includes the first pair of support holes 522-532. The first hollow passage 530 therefore extends across the cyclic housing 200 in a direction of the pitch axis 302 and on a first plane that is proximate with or adjacent to the base plate 410. And, the second hollow passage 540 extends across the cyclic housing 200 in a direction of the roll axis 304 and on a second plane above the first plane. The cyclic housing 200 thus mounts the pitch actuator 342 to be longitudinally disposed along the pitch axis 302 and near or above the base plate 410 of the mounting frame 330, and mounts the roll actuator 344 to be disposed along the roll axis 304 and above the pitch actuator 342.

Referring now to FIG. 7, a bottom dimension of the structural frame 500 along the pitch axis 302 may be sized to extend or fit between a gap 770 or distance between the housing coupling members 422-424 of the mounting frame 330. For instance, the length between the first pair of support holes 532-534 along the bottom portion 660 may match or correspond with the gap 770 such that, when the cyclic housing 200 is mounted on the mounting frame 330, the first pair of support holes 532-534 adjacently align or co-locate with respective ones of the housing coupling members 422-424.

Additionally, a top dimension 780 of the structural frame 500 along the roll axis 304 may be sized to support the stick base assembly 310 and the roll actuator 344 for rotation about the roll axis 304. For instance, the length between the second pair of support holes 542-544 along the top portion 650 may match or correspond with the length of the tubular body 312 of the stick base assembly 310 such that, when the stick base assembly 310 is mounted with the cyclic housing 200, the second pair of support holes 542-544 adjacently align or co-locate with respective rim ends of the stick base assembly 310. As also shown in FIG. 7, the structural frame 500 may further include a pitch guide 790 disposed between the second pair of support holes 542-544 and configured to limit the range of rotation of the cyclic housing 200 in either direction is it contacts the pitch guide surfaces 442-444 of housing coupling member 424.

Figure 8:
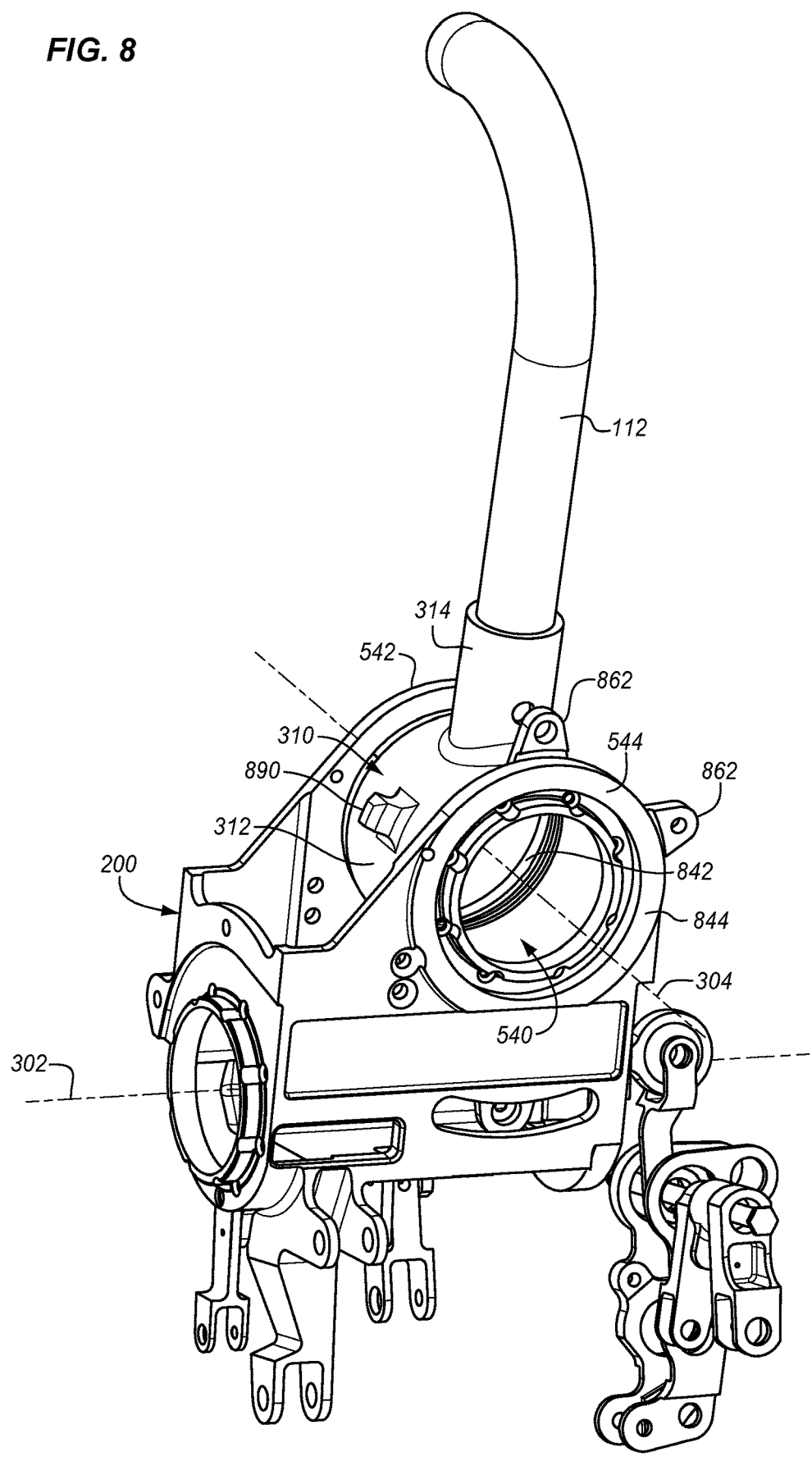
FIG. 8 is a perspective view of a stick base assembly mounted with a cyclic housing in an illustrative embodiment.

FIG. 8 is a perspective view of the stick base assembly 310 mounted with the cyclic housing 200 in an illustrative embodiment. FIG. 8 shows the structural configuration of the cyclic housing 200 and the stick base assembly 310 by omitting illustration of the mounting frame 330, the stick actuators 342-344, and the force sensors 362-364. The stick base assembly 310 extends between the second pair of support holes 542-544 of the cyclic housing 200. The tubular body 312 of the stick base assembly 310 includes end rims 842-844 which are spaced along and aligned with the roll axis 304. The end rims 842-844 axially align with one another and with the second pair of support holes 542-544 of the cyclic housing 200. For instance, as shown in FIG. 8, an end rim 844 may rotate at a position that is concentric with, radially inward from, and/or inside of second pair of support hole 544 of the cyclic housing 200. End rim 842 may be similarly positioned with respect to second pair of support hole 542.

This alignment enables rotatably mounting the stick base assembly 310 on the cyclic housing 200 for independent rotation about the roll axis 304, and also enables the roll actuator 344 to be inserted into the second hollow passage 540 to rotate with the stick base assembly 310 about the roll axis 304. In that regard, the cyclic housing 200 may include one or more attachment points 862 to couple with the roll actuator 344 for linked rotation. The cyclic housing 200 may also include one or more roll guides 890 disposed on the tubular body 312 and configured to limit the range of rotation of the stick base assembly 310 about the roll axis 304.

Figure 9:
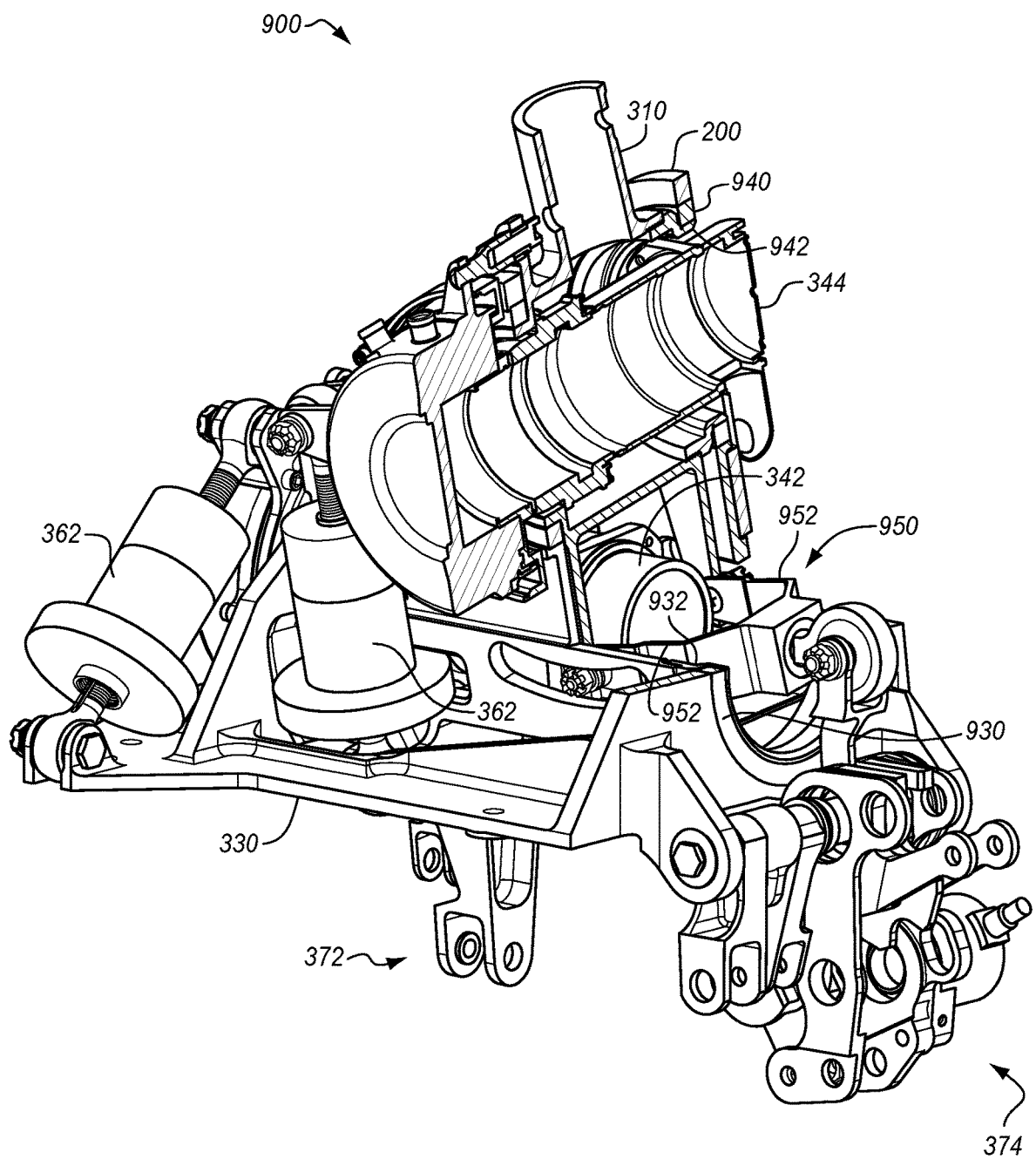
FIG. 9 is a perspective view of an apparatus for cyclic control of a rotorcraft in another illustrative embodiment.

FIG. 9 is a perspective view of an apparatus 900 for cyclic control of a rotorcraft in another illustrative embodiment. In addition to elements previously described, the apparatus 900 includes one or more pitch bearings 930 disposed between the mounting frame 330 and the cyclic housing 200. The pitch bearings 930 may be mounted in the pitch actuator holes 432-434 of the mounting frame 330. Additionally, one or more pitch bearing mounts 932 couple the pitch bearings 930 with the cyclic housing 200. For example, the pitch bearing mounts 932 may couple the first pair of support holes 532-534 to a respective pair of pitch bearings 930. The cyclic housing 200 is thus configured to mount to the mounting frame 330 and rotate with respect to the mounting frame 330 about the pitch axis 302.

Similarly, the apparatus 900 includes one or more roll bearings 940 disposed between the cyclic housing 200 and the stick base assembly 310. The roll bearings 940 may be mounted in the second pair of support holes 542-544 of the cyclic housing 200. Additionally, one or more roll bearing mounts 942 couple the roll bearings 940 with the stick base assembly 310. For example, the roll bearing mounts 942 may couple the end rims 842-844 of the stick base assembly 310 to respective roll bearings 940. The stick base assembly 310 is thus configured to mount to the cyclic housing 200 and rotate with respect to the cyclic housing 200 about the roll axis 304.

Furthermore, the apparatus 900 includes a wishbone linkage 950 to couple the stick base assembly 310 with the pitch connections 372 and the roll connections 374. The wishbone linkage 950 includes forked arms 952 that extend along the pitch axis 302 on either side of the pitch actuator 342. Thus, as the stick base assembly 310 is rotated about the roll axis 304 to control roll, the movement is translated around the pitch actuator 342 underneath the stick base assembly 310. The wishbone linkage 950 thus provides a technical benefit in enabling coupling to the existing mechanical linkages of the rotorcraft with multiple stick actuators 342-344 mounted in a compact configuration.

Figure 10:
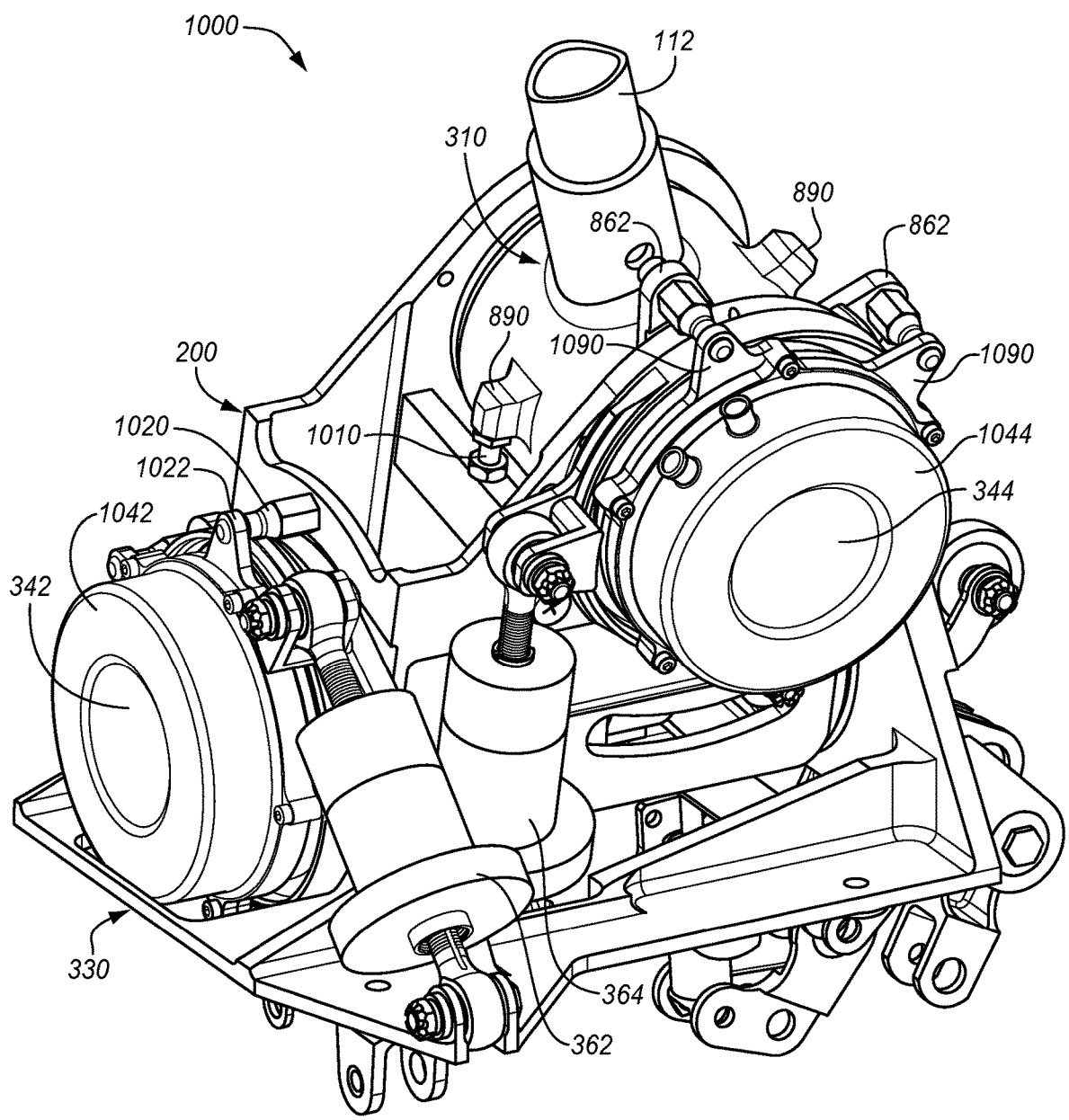
FIG. 10 is a perspective view of actuating cyclic flight control to a first position in an illustrative embodiment.

FIG. 10 is a perspective view of actuating cyclic flight control to a first position 1000 in an illustrative embodiment. In the first position 1000, the stick base assembly 310 rotates to control roll until one of its roll guides 890 contacts a first roll member 1010 fixed in the cyclic housing 200 to stop further roll rotation in that direction. As also shown in FIG. 10, the attachment points 862 on the stick base assembly 310 couple with corresponding attachment members 1090 on the hub 1044 of the roll actuator 344. Similarly, the cyclic housing 200 includes one or more coupling members 1020 to couple with corresponding attachment members 1022 on a hub 1042 of the pitch actuator 342. With the stick actuators 342-344 situated in the cyclic housing 200, the hubs 1042-1044 protrude outside the cyclic housing 200. Thus, the hub 1042 couples to the cyclic housing 200 across one of the housing coupling members 422-424 of the mounting frame 330, and the hub 1044 couples to the stick base assembly 310 across one of the second pair of support holes 542-544 of the cyclic housing 200.

Figure 11:
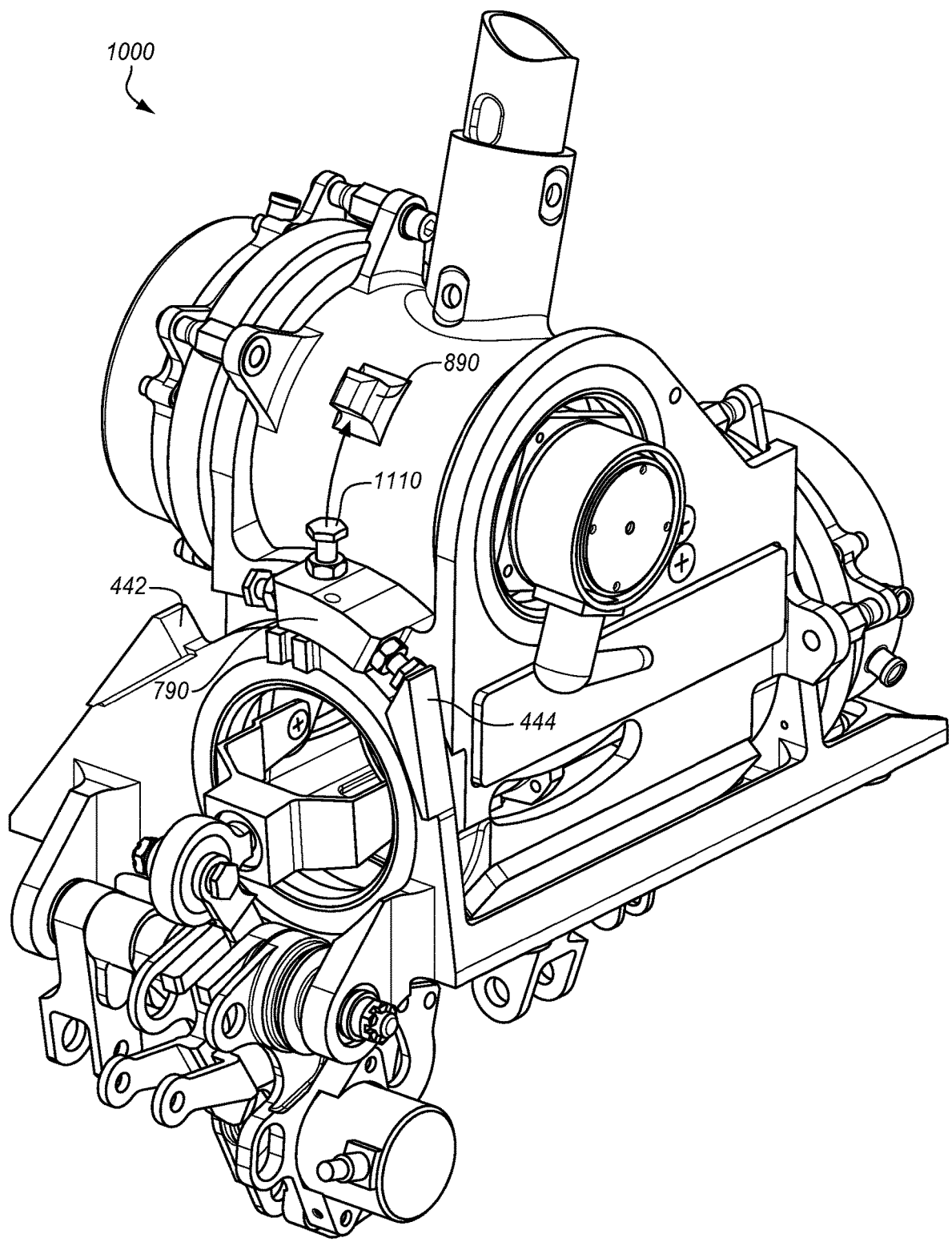
FIG. 11 is another perspective view of actuating cyclic flight control to the first position in an illustrative embodiment.

FIG. 11 is another perspective view of actuating cyclic flight control to the first position 1000 in an illustrative embodiment. As shown in FIG. 11, in the first position 1000, as one of the roll guides 890 contacts the first roll member 1010 (as shown in FIG. 10), the other one of the roll guides 890 is rotated away from a second roll member 1110 on the other side, as shown by the arrow. The second roll member 1110 may be disposed on the pitch guide 790 of the cyclic housing 200. As also shown in FIG. 11, in the first position 1000, the cyclic housing 200 rotates to control pitch until the pitch guide 790 contacts pitch guide surface 444 to stop further pitch rotation in that direction.

Figure 12:
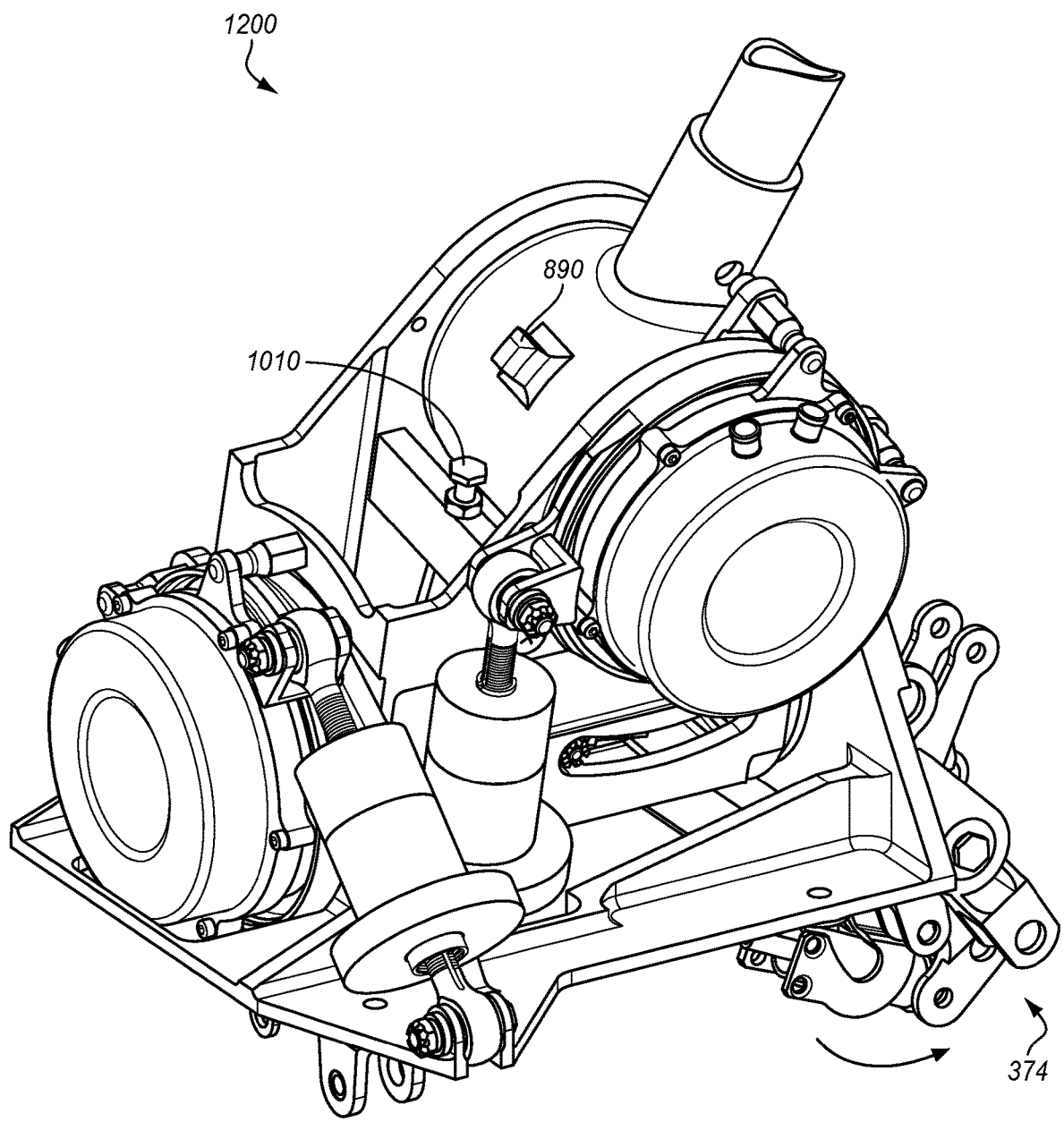
FIG. 12 is a perspective view of actuating cyclic flight control to a second position in an illustrative embodiment.

FIG. 12 is a perspective view of actuating cyclic flight control to a second position 1200 in an illustrative embodiment. In the second position 1200, the stick base assembly 310 rotates to control roll in the other direction such that one of its roll guides 890 rotates away from the first roll member 1010, as shown by the arrow. The rotorcraft is thus maneuvered to roll in the other direction as compared to the first position 1000.

Figure 13:
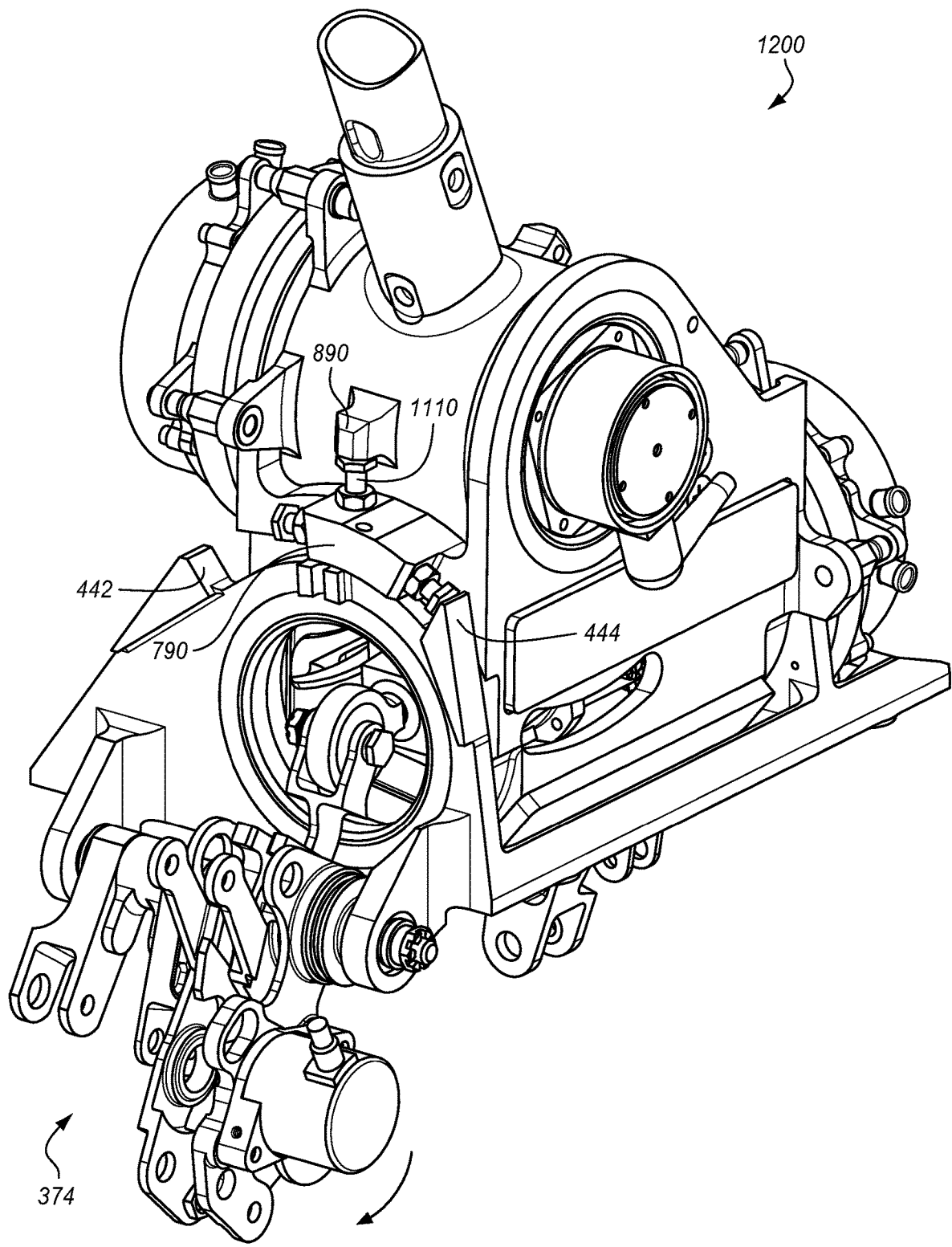
FIG. 13 is another perspective view of actuating cyclic flight control to the second position in an illustrative embodiment.

FIG. 13 is another perspective view of actuating cyclic flight control to the second position 1200 in an illustrative embodiment. As shown in FIG. 13, in the second position 1200, the other one of the roll guides 890 rotates toward the second roll member 1110 on the other side until it contacts the second roll member 1110 to stop further roll rotation in the other direction. The roll control thus actuates the roll connections 374 as shown by the arrows in FIGS. 12-13, thereby changing the roll orientation of the rotorcraft.

Figure 14:
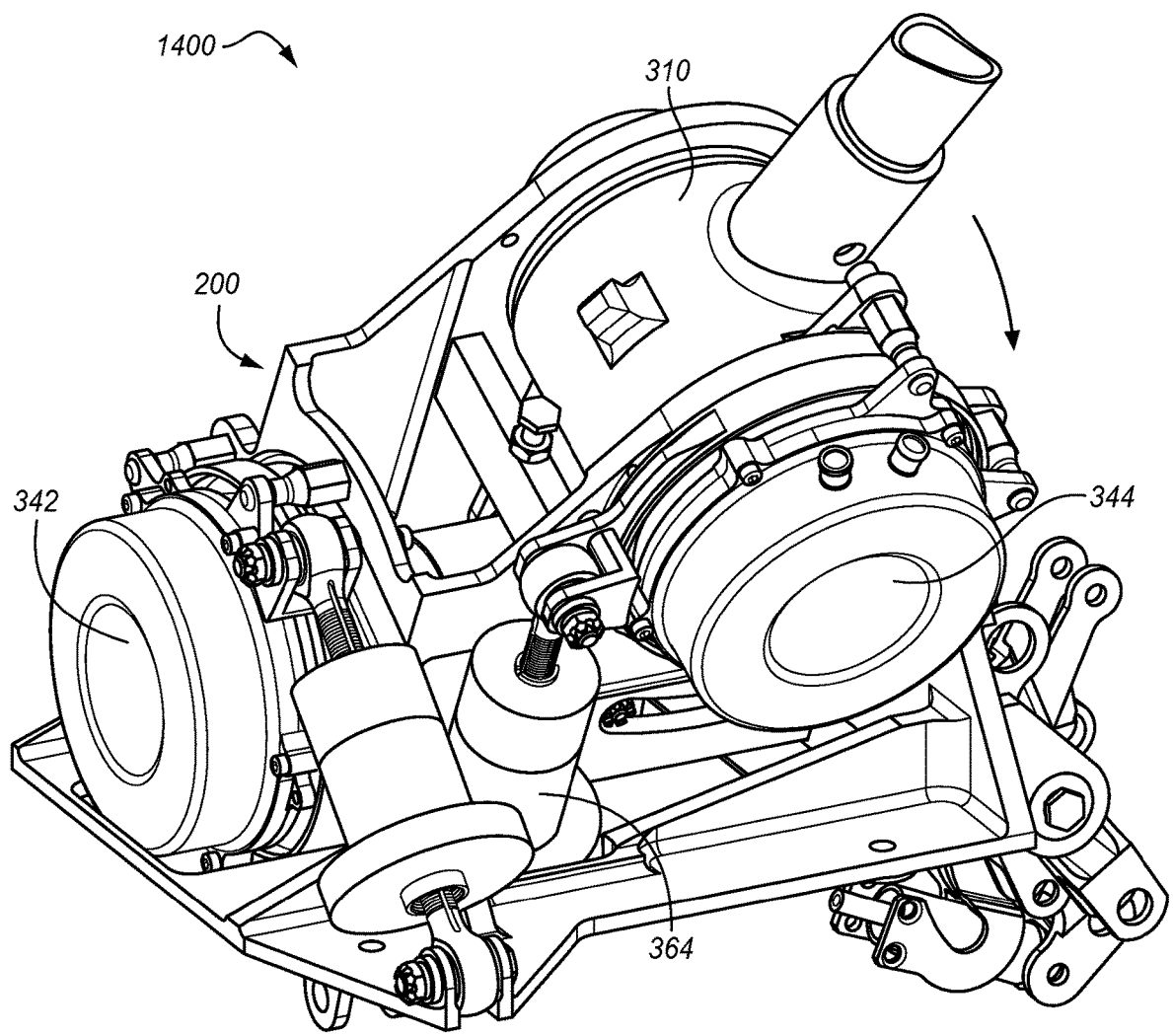
FIG. 14 is a perspective view of actuating cyclic flight control to a third position in an illustrative embodiment.
Figure 15:
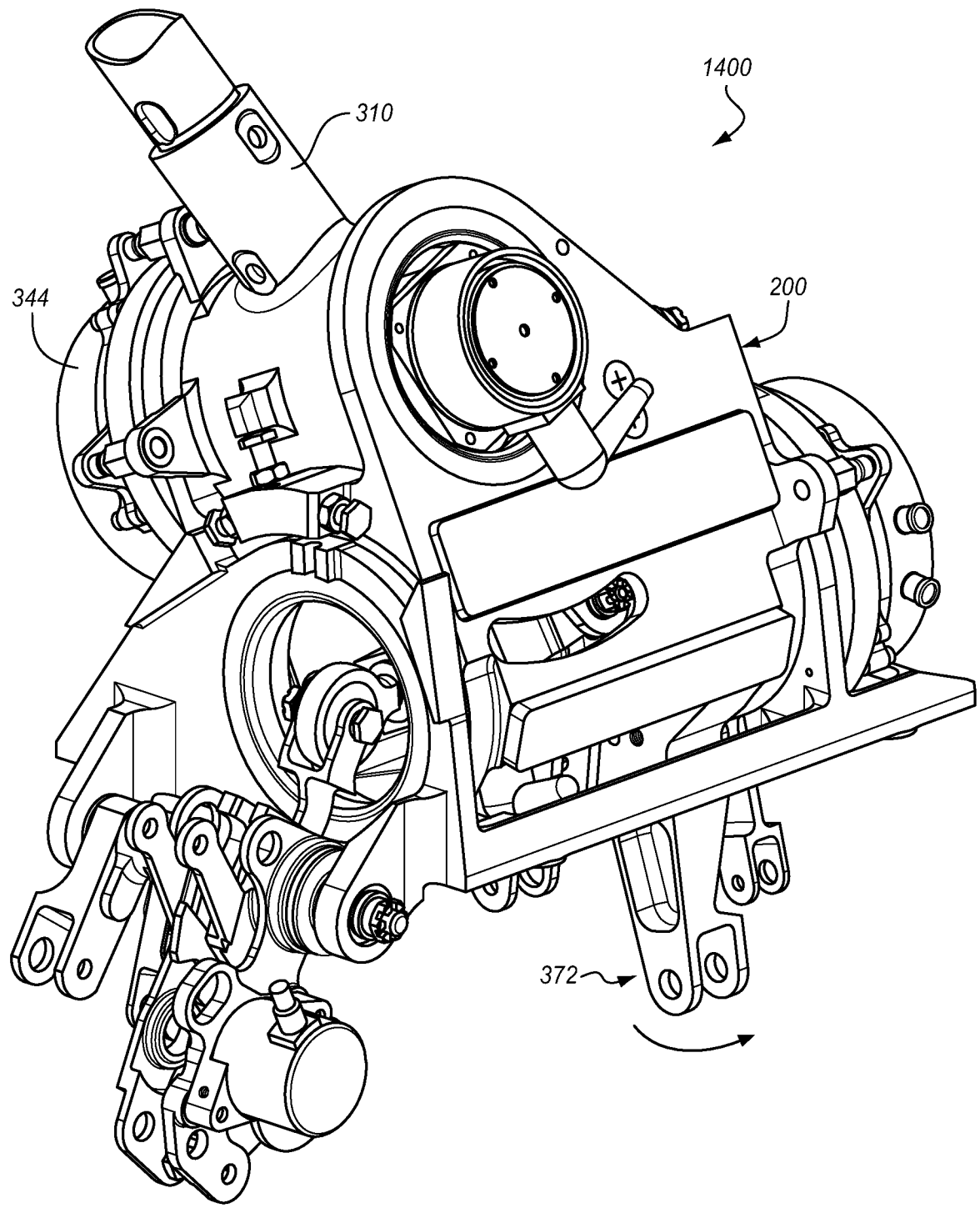
FIG. 15 is another perspective view of actuating cyclic flight control to the third position in an illustrative embodiment.

FIG. 14 is a perspective view of actuating cyclic flight control to a third position 1400 in an illustrative embodiment. FIG. 15 is another perspective view of actuating cyclic flight control to the third position 1400 in an illustrative embodiment. In transitioning from the second position 1200 to the third position 1400, the stick base assembly 310, the cyclic housing 200, the pitch actuator 342, the roll actuator 344, and the roll force sensor 364 rotate together to control pitch, as indicated by the arrows in FIG. 14. Thus, as shown in FIG. 15, in the third position 1400, the cyclic housing 200 rotates to control pitch until the pitch guide 790 contacts pitch guide surface 442 to stop further pitch rotation in the other direction. The pitch control thus actuates the pitch connections 372 as shown by the arrow in FIG. 15, thereby changing the pitch orientation of the rotorcraft.

Figure 16:
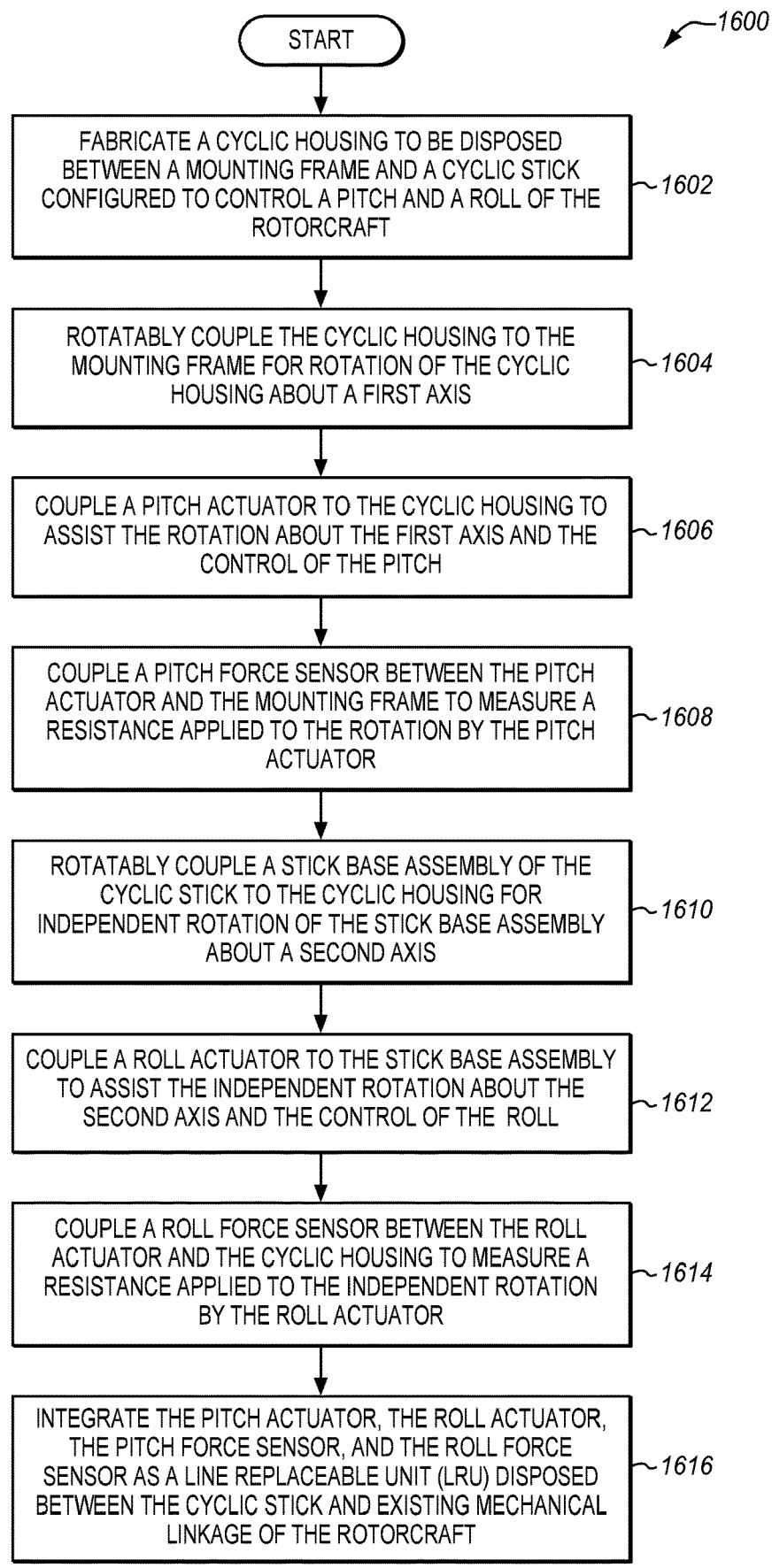
FIG. 16 is a flowchart illustrating a method of constructing a cyclic control apparatus of a rotorcraft in an illustrative embodiment.

FIG. 16 is a flowchart illustrating a method 1600 of constructing a cyclic control apparatus of a rotorcraft in an illustrative embodiment. The steps of the flowchart(s) will be described with reference to FIGS. 2-15, but those skilled in the art will appreciate that the methods may be performed with other systems and devices. The steps of the flowchart(s) described herein are not all inclusive, may include other steps not shown, and may be performed in an alternative order.

In step 1602, the cyclic housing 200 is fabricated to be disposed between the mounting frame 330 and the cyclic stick 112 configured to control a pitch and a roll of the rotorcraft. In step 1604, the cyclic housing 200 is rotatably couped to the mounting frame 330 for rotation of the cyclic housing 200 about a first axis (e.g., the pitch axis 302). In step 1606, the pitch actuator 342 is coupled to the cyclic housing 200 to assist the rotation about the first axis and the control of the pitch.

In step 1608, the pitch force sensor 362 is coupled between the pitch actuator 342 and the mounting frame 330 to measure a resistance applied to the rotation by the pitch actuator 342. In step 1610, the stick base assembly 310 is coupled to the cyclic housing 200 for independent rotation of the stick base assembly 310 about a second axis (e.g., the roll axis 304). In step 1612, the roll actuator 344 is coupled to the stick base assembly 310 to assist the independent rotation about the second axis and the control of the roll. In step 1614, the roll force sensor 364 is coupled between the roll actuator 344 and the cyclic housing 200 to measure a resistance applied to the independent rotation by the roll actuator 344. In step 1616, the pitch actuator 342, the roll actuator 344, the pitch force sensor 362, and the roll force sensor 364 are integrated in the cyclic housing 200 as a Line Replaceable Unit (LRU) disposed between the cyclic stick 112 and existing mechanical linkage 130 of the rotorcraft.

Although described in the context of cyclic control a single-rotor helicopter, embodiments described herein may also apply to dual-rotor helicopters and other types of aircrafts as well as alternative flight control configurations. Additionally, although specific embodiments were described herein, the scope is not limited to those specific embodiments. Rather, the scope is defined by the following claims and any equivalents thereof.

What is claimed is:

1. An apparatus for cyclic control of a rotorcraft, the apparatus comprising:
 a stick base assembly coupled with a cyclic stick and configured to rotate with respect to a mounting frame to control a pitch and a roll of the rotorcraft;
 a cyclic housing pivotably coupled with the mounting frame for rotation of the cyclic housing and the stick base assembly together about a pitch axis to control the pitch of the rotorcraft, and coupled with a pitch actuator to assist the rotation about the pitch axis, wherein a pitch force sensor coupled between the pitch actuator and the mounting frame measures a resistance applied to the rotation by the pitch actuator,
 the cyclic housing configured to support the stick base assembly for independent rotation of the stick base assembly about a roll axis to control the roll of the rotorcraft, wherein the stick base assembly couples with a roll actuator to assist the independent rotation about the roll axis, and a roll force sensor coupled between the roll actuator and the cyclic housing measures a resistance applied to the independent rotation by the roll actuators;
 pitch bearings disposed between the mounting frame and the cyclic housing to rotate the cyclic housing with respect to the mounting frame about the pitch axis; and
 roll bearings disposed between the cyclic housing and the stick base assembly to rotate the stick base assembly with respect to the cyclic housing about the roll axis.

2. The apparatus of claim 1, wherein:
 the pitch actuator is configured to provide automatic control of the pitch, and the pitch force sensor is configured to provide tactile feedback to the cyclic stick based on the automatic control of the pitch, and
 the roll actuator is configured to provide automatic control of the roll, and the roll force sensor is configured to provide tactile feedback to the cyclic stick based on the automatic control of the roll.

3. The apparatus of claim 1 wherein:
 the cyclic housing supports the pitch actuator along the pitch axis, and supports the roll actuator above the pitch actuator and along the roll axis that is perpendicular to the pitch axis.

4. The apparatus of claim 3 wherein:
 the cyclic housing includes a first hollow passage aligned with housing coupling members of the mounting frame to support rotation of the pitch actuator about the pitch axis, and a second hollow passage to support rotation of the roll actuator about the roll axis at a position above the pitch actuator.

5. The apparatus of claim 3 further comprising:
a wishbone linkage to couple the stick base assembly with roll connections, the wishbone linkage including arms disposed on either side of the pitch actuator to translate movement of the stick base assembly around the pitch actuator.

6. The apparatus of claim 1 wherein:
the cyclic housing is configured to integrate the pitch actuator, the roll actuator, the pitch force sensor, and the roll force sensor as a Line Replaceable Unit (LRU) disposed between the cyclic stick and existing mechanical linkage of the rotorcraft.

7. The apparatus of claim 1 wherein:
the cyclic housing is configured to enable mounting each of the pitch actuator, the roll actuator, the pitch force sensor, and the roll force sensor between the stick base assembly and the mounting frame.

8. The apparatus of claim 1 wherein:
the pitch force sensor is directly coupled with the mounting frame.

9. A method of constructing a cyclic control apparatus of a rotorcraft, the method comprising:
fabricating a cyclic housing to be disposed between a mounting frame and a cyclic stick configured to control a pitch and a roll of the rotorcraft;
rotatably coupling the cyclic housing to the mounting frame for rotation of the cyclic housing about a pitch axis;
coupling a pitch actuator to the cyclic housing to assist the rotation about the pitch axis and the control of the pitch;
coupling a pitch force sensor between the pitch actuator and the mounting frame to measure a resistance applied to the rotation by the pitch actuator;
rotatably coupling a stick base assembly of the cyclic stick to the cyclic housing for independent rotation of the stick base assembly about a roll axis;
coupling a roll actuator to the stick base assembly to assist the independent rotation about the roll axis and the control of the roll;
coupling a roll force sensor between the roll actuator and the cyclic housing to measure a resistance applied to the independent rotation by the roll actuators;
mounting the cyclic housing to the mounting frame via pitch bearings to rotate the cyclic housing about the pitch axis, wherein the cyclic housing houses the pitch actuator proximate to the mounting frame and in alignment with the pitch axis; and
mounting the stick base assembly to the cyclic housing via roll bearings to rotate the stick base assembly about the roll axis perpendicular to the pitch axis, wherein the cyclic housing houses the stick base assembly and the roll actuator coupled thereto above the pitch actuator and in alignment with the roll axis.

10. The method of claim 9 further comprising:
integrating the pitch actuator, the roll actuator, the pitch force sensor, and the roll force sensor as a Line Replaceable Unit (LRU) disposed between the cyclic stick and existing mechanical linkage of the rotorcraft.

11. The method of claim 10 further comprising:
installing the LRU into the rotorcraft at a pivot point of the cyclic stick.

12. The method of claim 9 further comprising:
mounting each of the pitch actuator, the roll actuator, the pitch force sensor, and the roll force sensor between the stick base assembly and the mounting frame.

13. The method of claim 9 further comprising:
directly coupling the pitch force sensor to the mounting frame.

14. An apparatus comprising:
a cyclic housing including a structural frame to rotatably couple with a mounting frame, the structural frame including:
a bottom portion rotatably mounted to the mounting frame and including a first hollow passage along a pitch axis sized to receive a pitch actuator that rotates about the pitch axis to control a pitch of a rotorcraft; and
a top portion disposed above the bottom portion and including a second hollow passage along a roll axis sized to receive a roll actuator that rotates about the roll axis to control a roll of the rotorcraft.

15. The apparatus of claim 14, further comprising:
pitch bearings disposed between the mounting frame and the cyclic housing to rotate the cyclic housing with respect to the mounting frame about the pitch axis; and
roll bearings disposed between the cyclic housing and a stick base assembly to rotate the stick base assembly with respect to the cyclic housing about the roll axis.

16. The apparatus of claim 14, wherein:
the first hollow passage aligns with housing coupling members of the mounting frame to receive the pitch actuator, and
the second hollow passage aligns with end rims of the stick base assembly to receive the roll actuator.

17. The apparatus of claim 14, further comprising:
an attachment point to couple the stick base assembly with the roll actuator, and
an attachment member to couple the cyclic housing with the pitch actuator.

18. The apparatus of claim 14, further comprising:
a pitch force sensor coupled between the pitch actuator and the mounting frame to measure rotation force of the pitch actuator.

19. The apparatus of claim 14, further comprising:
a roll force sensor coupled between the roll actuator and the cyclic housing to measure rotation force of the roll actuator.

20. The apparatus of claim 14, wherein:
the cyclic housing mounts the pitch actuator and the roll actuator in a vertical configuration below a cyclic stick of the rotorcraft.

* * * * *